United States Patent
Zeng

(10) Patent No.: US 12,083,762 B2
(45) Date of Patent: Sep. 10, 2024

(54) MOLDING PROCESS FOR SHOES WITH INNER LINING

(71) Applicant: HONESTY RUBBER AND PLASTIC MFG. CO. LTD, Guangdong (CN)

(72) Inventor: Jiaming Zeng, Guangdong (CN)

(73) Assignee: HONESTY RUBBER AND PLASTIC MFG. CO. LTD, Guangdong (CN)

( * ) Notice: Subject to any disclaimer, the term of this patent is extended or adjusted under 35 U.S.C. 154(b) by 315 days.

(21) Appl. No.: 17/683,393

(22) Filed: Mar. 1, 2022

(65) Prior Publication Data
US 2023/0049211 A1    Feb. 16, 2023

(30) Foreign Application Priority Data
Aug. 10, 2021 (CN) .......................... 202110914219.2

(51) Int. Cl.
| | | |
|---|---|---|
| *B29D 35/14* | (2010.01) | |
| *B29C 43/18* | (2006.01) | |
| *B29C 45/00* | (2006.01) | |
| *B29C 69/00* | (2006.01) | |
| *B29D 35/00* | (2010.01) | |
| *B29L 31/50* | (2006.01) | |

(52) U.S. Cl.
CPC .......... *B29D 35/146* (2013.01); *B29C 43/183* (2013.01); *B29C 45/0053* (2013.01); *B29C 69/007* (2013.01); *B29D 35/0027* (2013.01); *B29L 2031/50* (2013.01)

(58) Field of Classification Search
CPC ....................... B29D 35/0018; B29D 35/0027
See application file for complete search history.

(56) References Cited

U.S. PATENT DOCUMENTS

| | | | |
|---|---|---|---|
| 2013/0300029 A1* | 11/2013 | Cook ................... | B29D 35/084 |
| | | | 425/503 |
| 2015/0150335 A1 | 6/2015 | Healy et al. | |
| 2020/0353658 A1* | 11/2020 | Goshima ............. | B29C 45/2708 |
| 2022/0016860 A1 | 1/2022 | Wang et al. | |

FOREIGN PATENT DOCUMENTS

| | | | | |
|---|---|---|---|---|
| CN | 107139391 A | | 9/2017 | |
| CN | 111284053 A | | 6/2020 | |
| CN | 112622138 A | * | 4/2021 | ............. B29B 7/005 |
| CN | 213766942 U | | 7/2021 | |

OTHER PUBLICATIONS

Translation of CN 112622138 A (Year: 2021).*
Translation of CN 213766942 U (Year: 2021).*
The 1st Office Action dated Nov. 1, 2022 for the Chinese Patent Application No. CN202110914219.2.

* cited by examiner

*Primary Examiner* — John J DeRusso
(74) *Attorney, Agent, or Firm* — Yue (Robert) Xu; Apex Attorneys at Law, LLP

(57) ABSTRACT

A molding process for shoes with inner lining comprises: placing a molding inner core sleeved with an inner lining in a combined external mold being preset with a semi-molded shell; performing a mold-closing action to make the semi-molded shell in the first external mold and the second external mold attach to the inner lining, respectively; and heating to vulcanize the semi-molded shell, and combining with the inner lining to produce a shoe with inner lining.

8 Claims, 6 Drawing Sheets

MOLDING PROCESS FOR SHOES WITH INNER LINING

FIELD

The present disclosure relates to the technical field of shoe production, and in particular to a molding process for shoes with inner lining.

BACKGROUND

Shoes made of rubber have the properties of oil resistance, slipping resistance, high temperature resistance and cold resistance, so rubber shoes can be widely applied in rain boots, labor protection shoes, outdoor shoes and other products. In conventional technology, in view of the immature molding technology of rubber shoes, it is necessary to produce an outer shoe body with rubber-shell by the vulcanization shoe molding process with a manual operation first, and then place an inner lining inside the shoe body with rubber-shell. The shoe body with rubber-shell and the inner lining are connected by manual pasting or sewing to obtain the finished shoes with the inner lining. The above-mentioned steps of vulcanization shoe molding process are cumbersome, and additional procedures are needed for the placement of inner lining, which requires more manpower and material resources, resulting in higher production cost, which is not beneficial for mass production of finished shoes.

The molding process of plastic shoe is relatively mature, and many manufacturers use plastic material to make shoes with linings. However, due to the differences between the properties of plastic and rubber, plastic shoes are far less than rubber shoes in terms of oil resistance, slipping resistance, high temperature resistance and cold resistance, so it is still difficult to replace rubber shoes by plastic shoes.

SUMMARY

In view of the drawbacks of the conventional technology, a molding process for shoes with inner lining is provided according to the present disclosure, which solves the problem in the conventional technology that it is difficult to produce rubber shoes with inner lining by molding.

In order to achieve the above object, the following technical solutions are provided according to the present disclosure:

a molding process for shoes with an inner lining, which is configured to realize the combined molding of a shoe shell and the inner lining and comprises:

providing a combined external mold comprising a first external mold and a second external mold; a molding inner core which can be placed in the combined external mold and cooperate for the mold-closing or mold-opening action, wherein the molding inner core is configured to be sleeved by the inner lining; placing the molding inner core in the combined external mold to form a shoe body molding space between the molding inner core and the combined external mold after mold closing, wherein the shoe body molding space matches the combination shape of the shoe shell and the inner lining;

the molding process for shoes with inner lining comprises the following steps:

placing a molding inner core sleeved with an inner lining in a combined external mold being preset with a semi-molded shell;

performing a mold-closing action to make the semi-molded shell in the first external mold and the second external mold attach to the inner lining, respectively;

heating to vulcanize the semi-molded shell, and combining with the inner lining to produce a shoe with inner lining.

In an embodiment, the molding process further provides: a preset inner core which can be placed in the combined external mold and cooperate with it for a mold-closing or mold-opening action; placing the preset inner core in the combined external mold, and form a shell molding space between the preset inner core and the combined external mold after mold closing; wherein the shell molding space matches the shape of the shoe shell;

wherein the molding process for shoes with inner lining further comprises:

placing the preset inner core in the combined external mold and performing a mold-closing action;

injecting a hot-melt adhesive into the shell molding space to form a semi-molded shell adhered to the inner walls of the first external mold and the second external mold; and performing a mold-opening action to separate the semi-molded shell along the joint of the first external mold and the second external mold to form two parts that move with the first external mold and the second external mold, respectively.

In an embodiment, regarding the molding process for shoes with inner lining, a shape and a size of the preset inner core are the same with a shape and a size of the combination of the molding inner core and the inner lining;

the first external mold and the second external mold are thermal forming molds, and the molding inner core is a cold forming mold.

In an embodiment, regarding the molding process for shoes with inner lining, the semi-molded shell is in an unshaped semi-molded state, and the semi-molded state is between a molten state and a curing molded state;

the plasticizing material is rubber, and the inner lining is a foamed layer made of SBR material.

In an embodiment, the molding process for shoes with inner lining further comprises:

performing a smooth finish treatment on the outer surface of the preset inner core so as to smooth the outer surface of the preset inner core.

In an embodiment, regarding the molding process for shoes with inner lining, the first external mold and the second external mold are provided with a molding groove at opposite sides for molding the semi-molded shell;

the molding process for shoes with inner lining further comprises:

performing a surface roughening treatment on the inner walls of the molding groove to roughen the groove walls of the molding groove.

In an embodiment, regarding the molding process for shoes with inner lining, the smooth finish treatment is Teflon electroplating, and the surface roughening treatment is sandblasting.

In an embodiment, regarding the molding process for shoes with inner lining, a first partition is provided on the preset inner core;

the preset inner core is placed in the combined external mold, and the shell molding space is separated into a separate space by the first partition after mold closing; wherein the separate space is configured to form a partial semi-molded shell;

placing the molding inner core sleeved with inner lining into the combined external mold preset with the partial semi-molded shell; the partial semi-molded shell is attached to the inner lining after mold closing, and the inner lining has a part exposed to the partial semi-molded shell.

In an embodiment, regarding the molding process for shoes with inner lining, a second partition is provided on the preset inner core, and the second partition is located at the joint of the first external mold and the second external mold after mold closing;

the separation to the semi-molded shell along the joint of the first external mold and the second external mold comprises:

the semi-molded shell is separated along the second partition.

In an embodiment, the molding process for shoes with inner lining further provides a top mold and a bottom mold, a sliding groove is provided on the top mold or the bottom mold, and the sliding groove is provided between the first external mold and the second external mold, and an extension direction of the sliding groove is perpendicular to the movement direction of the first external mold and the second external mold when the combined mold being closed;

the preset inner core/the molding inner core slides along the sliding groove to a position between the first external mold and the second external mold when being placed in the combined external mold.

Compared with the conventional technology, the present disclosure has the following beneficial effects:

a molding process for shoes with inner lining is provided according to the present disclosure. The molding inner core sleeved with the inner lining is matched with the combined external mold to perform a mold closing, and after heating, the semi-molded shell and the inner lining are combined and vulcanized so as to produce a shoe with inner lining. According to the present disclosure, the operation of placing the inner lining in the shoe body with rubber-shells and further pasting or sewing is omitted, and a rubber shoes with the inner lining produced by molding is realized. Meanwhile, the present disclosure effectively improves the production efficiency of shoes with inner lining and reduces the production cost. Due to not relying on manual pasting and sewing processes, it can ensure the quality of the finished shoe with inner lining, which is beneficial to improve the user experience.

BRIEF DESCRIPTION OF THE DRAWINGS

In order to more clearly illustrate the technical solution in the embodiments of the present application or in the prior art, the drawings referred to in the description of the embodiments or the prior art will be briefly introduced hereinafter. Obviously, the drawings in the following description are only some embodiments of the present application. For those skilled in the art, other drawings can also be obtained according to these drawings without any creative work.

NUMERAL REFERENCE IN FIGURES

11 first external mold, 12 second external mold, 13 glue injection runner, 14 molded inner core, 15 sliding groove, 16 runner pipe, 17 clamping joint 18 preset inner core, 181 second partition, 191 top mold, 192 bottom mold, 20 shell molding space.

DETAILED DESCRIPTION OF THE EMBODIMENTS

For making the objects, features and advantages of the present application clearer and easier to be understood, the technical solutions according to the present application are described in detail hereinafter in conjoint with the drawings in the embodiments of the present application. Apparently, the embodiments described hereinafter are only a part of the embodiments of the present application, rather than all embodiments. Any other embodiments obtained by those skilled in the art based on the embodiments in the present disclosure without any creative effort shall fall within the protection scope of the present disclosure.

Technical solutions of the present disclosure will be further described through the embodiments and in conjoint with drawings.

Figure 1:
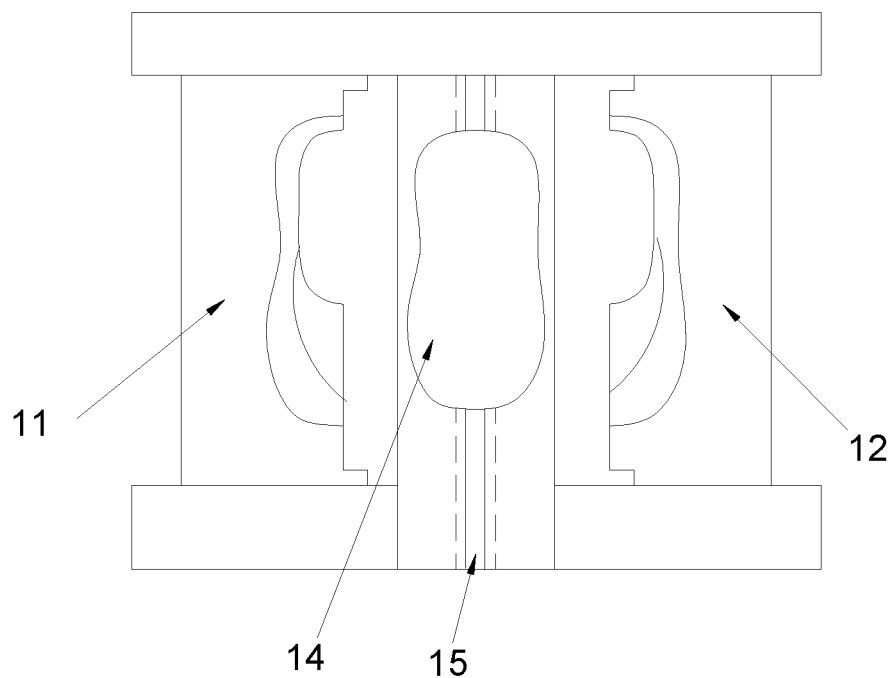
FIG. 1 is a schematic view of a mold structure for producing shoes with inner lining in the present disclosure.
Figure 2:
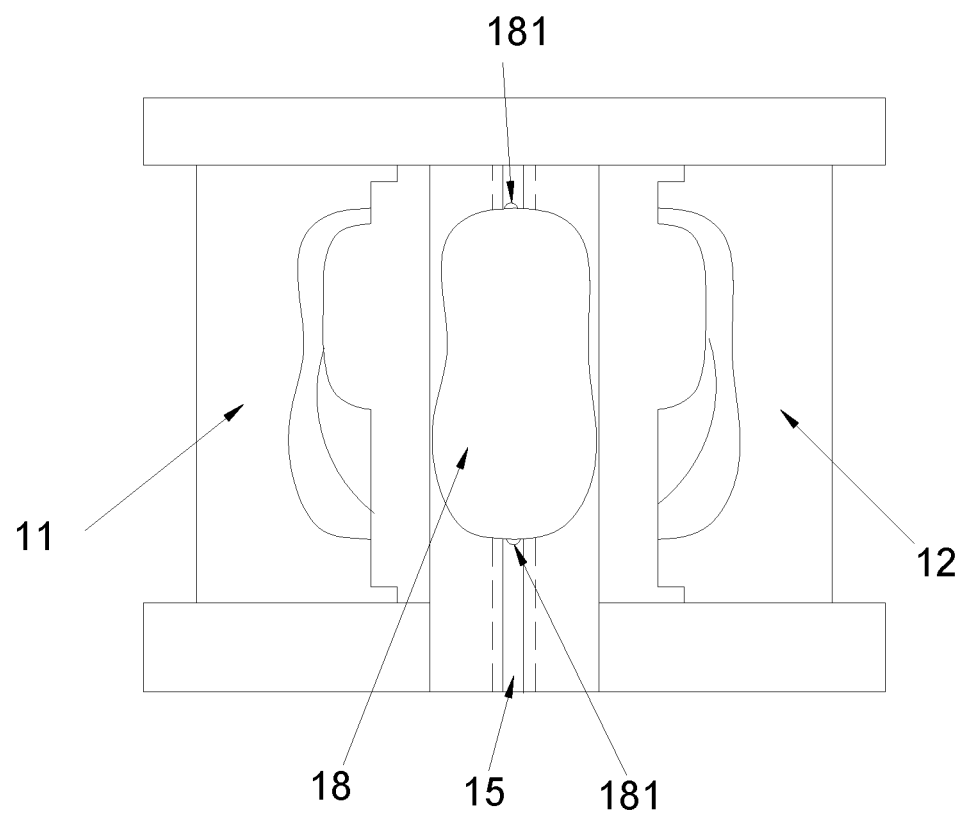
FIG. 2 is a schematic view of another mold structure for producing shoes with inner lining in the present disclosure.
Figure 3:
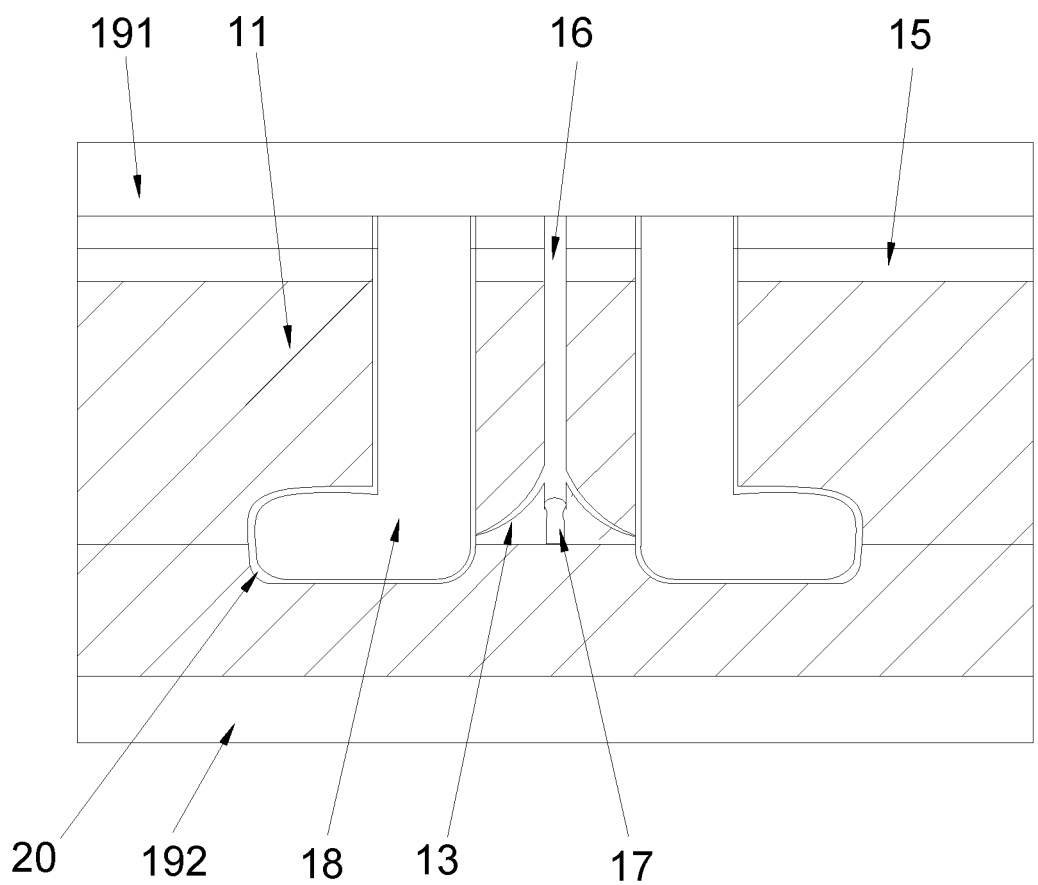
FIG. 3 is a schematic view of yet another mold structure for producing shoes with inner lining in the present disclosure.

Referring to FIG. 1 to FIG. 3, a molding process for a shoe with an inner lining is provided according to the embodiments of the present disclosure, which is configured to achieve the aims for high efficient production of rubber shoes with inner lining and ensuring product quality.

According to this embodiment, a combined external mold is provided, which includes a first external mold 11 and a second external mold 12; and a preset inner core 18 and a molding inner core 14 which can be placed in the combined external mold and cooperate with it for a mold-closing or mold-opening actions are further provided.

When the preset inner core 18 is placed in the combined external mold, a shell molding space 20 matching the shape of the shoe shell is formed between the preset inner core 18 and the combined external mold after mold closing. When the molding inner core 14 is placed in the combined external mold, a shoe body molding space matching the combination shape of the shoe shell and the inner lining is formed between the molding inner core 14 and the combined external mold after mold closing.

Herein, the preset inner core 18 is configured to cooperate with the combined external mold for mold closing so as to obtain the pre-molding of the semi-molded shell. It should be understood that the semi-molded shell is formed as the shell of the finished shoe after being cured and molded. The molding inner core 14 is configured to be sleeved with the inner lining, and to make the semi-molded shell and the inner lining be combined and molded so as to obtain the shoe with inner lining by cooperating with the combined external mold during mold closing.

In this embodiment, the shape and size of the preset inner core 18 are the same with the shape and size of the combination of the molding inner core 14 and the inner lining; or, the size of the preset inner core 18 is larger than the size of the combination of the molding inner core 14 and the inner lining. Therefore, when the combined external mold to which the semi-molded shell is adhered is combined with the molding inner core 14, the formed space can just accommodate the inner lining, or is narrower than the inner lining. Based on this, it facilitates of ensuring a sufficient contact between the inner lining and the semi-molded shell, and improve the adhesion between the inner lining and the semi-molded shell. Meanwhile, the pressure applied by the first external mold 11 and the second external mold 12 on the shoe lining during mold closing can be controlled by controlling the size of the preset inner core 18 so as to prevent the semi-molded shell from infiltrating into the shoe lining due to excessive pressure.

The inner lining is a foamed layer made of SBR material, which has high air permeability and covering properties, and can provide the shoes with a better comfortability and thermal insulation property. In addition, the foam structure of the inner lining can increase the adhesion with the semi-molded shell. In this embodiment, the first external mold 11 and the second external mold 12 are thermal forming molds, and the molding inner core 14 is a cold forming mold, which can ensure the effective combination of the shoe inner lining and the semi-molded shell while avoiding the shrinkage and deformation of the inner lining under high temperature.

Figure 4:
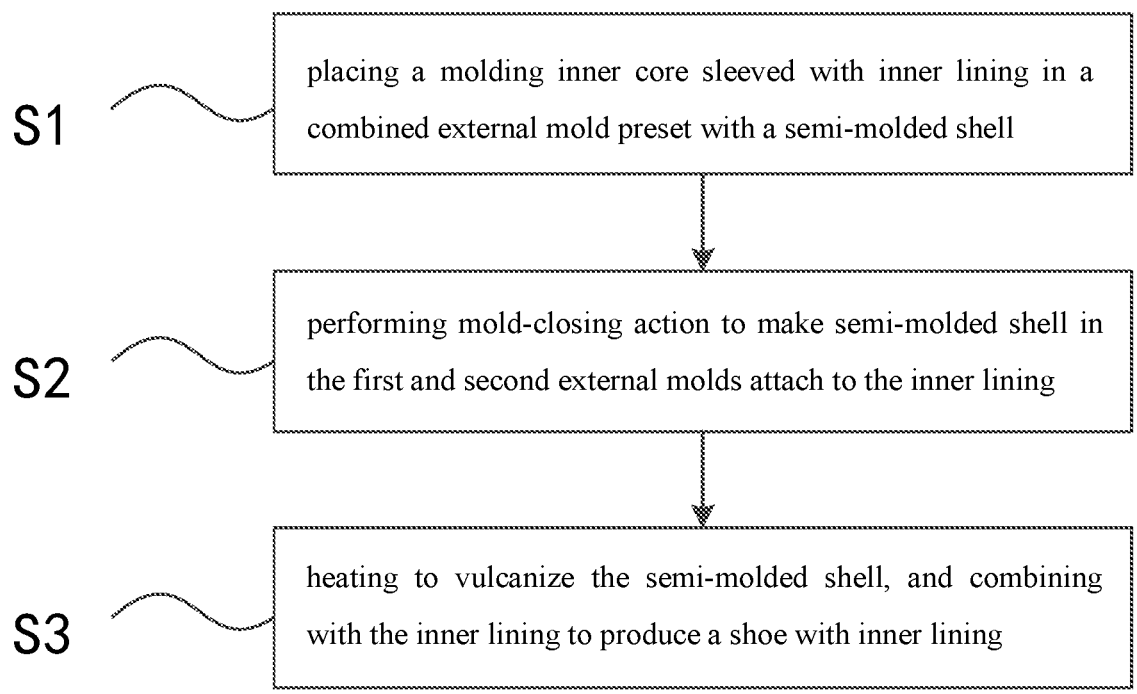
FIG. 4 is a flow chart of a molding process for shoes with inner lining provided by the present disclosure.

Referring to FIG. 4, the molding process for shoes with inner lining provided in this embodiment includes the following steps:

S1, place a molding inner core 14 sleeved with an inner lining into a combined external mold being preset with a semi-molded shell;

S2, perform a mold-closing action to make the semi-molded shell in the first external mold and the second external mold attach to the inner lining, respectively;

S3, heat to vulcanize the semi-molded shell, and combine with the inner lining to produce a shoe with inner lining.

Specifically, the semi-molded shell are in a semi-molded state, which is between a molten state and a curing molded state and has some fluidity, and thus the semi-molded shell can be adhered to the first external mold 11 and the second external mold 12.

In this embodiment, the semi-molded shell may be manually placed in the first external mold 11 and the second external mold 12, or placed on the outside of the molding inner core 14 sleeved with the shoe lining, and the semi-molded shell may also be molded in the first external mold 11 and the second external mold 12 by injection molding, Hereinafter, the method of molding by injection molding will be taken as an example to further describe the technical solution of the present disclosure.

Figure 5:
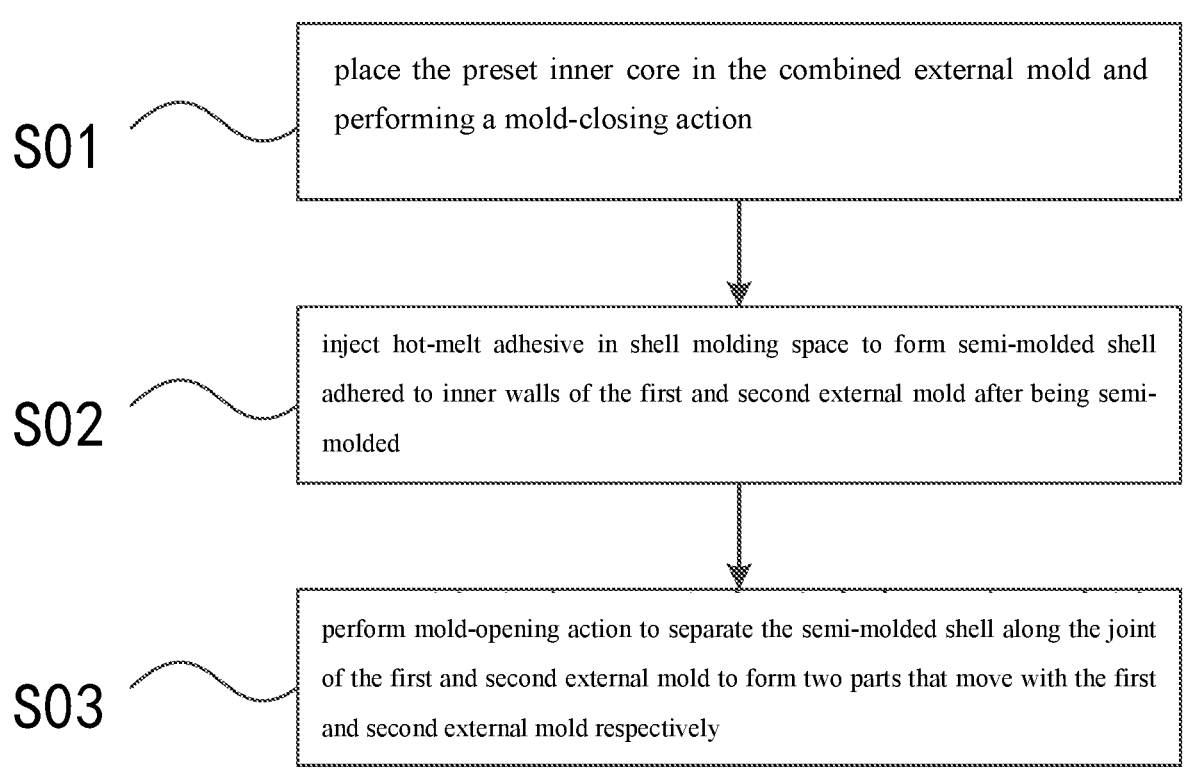
FIG. 5 is another flow chart of a molding process for shoes with inner lining provided by the present disclosure.

Referring to FIG. 5, the molding process for shoes with inner lining provided in this embodiment further includes the following steps before the step S1:

S01, place the preset inner core 18 in the combined external mold and perform a mold-closing action;

S02, inject a hot-melt adhesive into the shell molding space 20 to form a semi-molded shell adhered to the inner walls of the first external mold 11 and the second external mold 12 after being semi-molded;

S03, perform a mold-opening action to separate the semi-molded shell along the joint of the first external mold 11 and the second external mold 12 so as to form two parts that move with the first external mold 11 and the second external mold 12, respectively.

Through steps S01 to S03, the pre-molding to the semi-molded shell is performed in the shell molding space 20 inside the combined external mold.

After the molding of the semi-molded shell is completed, the preset inner core 18 is replaced with the molding inner core 14, and then place the molding inner core 14 between the first external mold 11 and the second external mold 12, which are preset with a semi-molded shell. After the mold being closed, the semi-molded shell and the inner lining in the shoe molding space are attached, and then the semi-molded shell and the inner lining are combined and vulcanized by heating. The bonding force between the semi-molded shell and the shoe lining can be enhanced, and the molded shoe with the shoe lining can be obtained after molding.

Further, in this embodiment, the plasticizing material configured to mold the shell of the shoe is rubber. Therefore, the molding process for shoes with inner lining provided by this embodiment can be configured to realize the molding of rubber shoes with inner lining.

Since the rubber can be processed into a semi-molded state, and can be molded into a semi-molded shell in a semi-molded state in step S02. The semi-molded state is between a molten state and a curing molded state and has certain fluidity and surface tension, and thus the semi-molded shell can be adhered to the first external mold 11 and the second external mold 12 and be separated during the mold-opening action to form two parts that move with the first external mold 11 and the second external mold 12, respectively.

In order to avoid the influence of the semi-molded shell adhering to the preset inner core 18 applying to the finished product quality during the mold-opening action, in this embodiment, a smooth finish treatment is performed on the outer surface of the preset inner core 18 to smooth the outer surface of the preset inner core 18.

Specifically, the smooth finish treatment is Teflon electroplating, and may also be performed by grinding and polishing.

Further, in this embodiment, the opposite sides of the first external mold 11 and the second external mold 12 are provided with a molding groove, respectively, for presetting or molding a semi-molded shell. In order to increase the adhesion between the semi-molded shell and the molding grooves, a surface roughening treatment is performed on the inner walls of the molding grooves to roughen the groove walls of the molding grooves.

Specifically, the surface roughening treatment is sandblasting, and it is also possible to form a pattern on the groove walls of the molding grooves by sculpturing, so as to realize the roughening of the surface of the groove walls of the molding grooves.

In this embodiment, a first partition is provided on the preset inner core 18. The preset inner core 18 is placed in the combined external mold, and the first partition separates the shell molding space 20 after the mold being closed so as to form a separate space. When injecting the hot-melt adhesive into the shell molding space 20, the hot-melt adhesive is filled into the separated space to form a partial semi-molded shell.

The molding inner core 14 sleeved with inner lining is placed in the combined external mold preset with the partial semi-molded shell. After mold closing, the partial semi-molded shell is attached to the inner lining, and the inner lining has a part exposed to the partial semi-molded shell. By the preset inner core 18 with the first partition, the inner lining of the shoe with inner lining can have a part exposed to the outer shell, and thus the multi-functionalization of the shoe is obtained.

It should be understood that the first partition is provided on the preset inner core 18, which can extend in a circumferential direction along the part corresponding to the ankle, and can also extend in a direction along the sole toward the upper of the shoe, and the shape of the first partition can be determined according to specific requirements.

In addition, the preset inner core 18 is provided with a convex second partition 181, the second partition 181 is located at the joint of the first external mold 11 and the second external mold 12 after mold closing. By providing the second partition 181, the semi-molded shell can be evenly separated along the second partition 181 during the mold-opening action, which facilitates the joint surfaces of the two hemi parts of semi-molded shell of being flat and smooth in the subsequent mold closing, and thus facilitates of keeping the quality of the finished product.

Further, the molding process for shoes with inner lining provided by this embodiment further provides a top mold 191 and a bottom mold 192. A sliding groove 15 is provided on the top mold 191 or on the bottom mold 192 and is provided between the first external mold 11 and the second external mold 12. An extension direction of the sliding groove 15 is perpendicular to the movement direction of the first external mold 11 and the second external mold 12 during mold closing.

In step S1 and step S01, the preset inner core 18/molding inner core 14 is placed in the combined external mold and slide along the sliding groove 15 so that the preset inner core 18/molding inner core 14 can be placed between the first external mold 11 and the second external mold 12 to cooperate in order to realize the mold-closing action and that the preset inner core 18/molding inner core 14 can also be separated from the location between the first external mold 11 and the second external mold 12 to cooperate in order to realize the mold-opening action.

In this embodiment, the sliding groove 15 is a T-shaped sliding groove 15 which can improve the smoothness and stability of the sliding action.

Further, in this embodiment, regarding the mold-closing action, a glue injection runner 13 is formed in the joint surface of the first external mold 11 and the second external mold 12. A material feeding port of the glue injection runner 13 is in communication with the glue injection runner 13 through a runner pipe 16.

Herein, the glue injection runner 13 is in shape of cone which is curved, and its tapered mouth is in communication to the shoe body molding space, and thus the flow rate of the rubber material can be more uniform and slow, which ensures the uniform thickness of the semi-molded shell and ensures the quality of molded shoes.

Further, the glue injection runner 13 is a spiral cone, this configuration can result in the adhesion between every area of the semi-molded shell surface and the first external mold 11 or the second external mold 12 more uniform, which facilitates the stripping of the molded shoe from the first external mold 11 and the second external mold 12 of being more smooth.

In this embodiment, a clamping joint 17 is provided on the top mold 191 or the bottom mold 192, and the runner pipe 16 is sleeved on the clamping joint 17. An inner step is formed on the inner pipe wall at one end of the runner pipe 16, and the inner step forms a clamping connection with the clamping joint 17. When the combined mold is opened, the bottom mold 192 and the top mold 191 are moved in opposite. The runner pipe 16 can be moved following the movement driven by the clamping joint 17 on the top mold 191 or the bottom mold 192 so as to be removed from the glue injection runner 13. The clamping joint 17 may be arranged on the top mold 191 or on the bottom mold 192, which can be specifically adjusted according to actual operation requirements.

Figure 6:
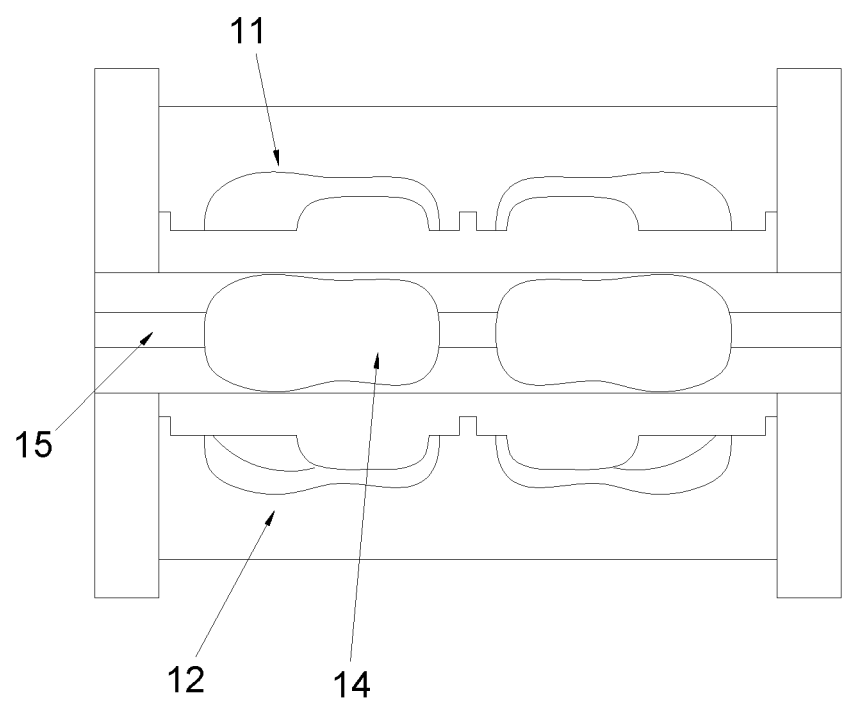
FIG. 6 is a schematic view of a mold structure for producing a pair of shoes with inner lining in the present disclosure.

Referring to FIG. 6, it should be understood that one combination of a first external mold 11, a second external mold 12 and a molding inner core 14 can be configured to produce one molded shoe. Two of the aforementioned combinations can be provided according to actual requirements to realize the simultaneous molding of a pair of molded shoes, or multiple combinations can be provided to realize batch molding of the molded shoes.

Based on the foregoing embodiments, the present disclosure has the following beneficial effects:

in the conventional technology, a cold forming mold is applied for molding of the plastic shoes, the required mold closing pressure is small, the fluidity of the plasticizing material after heating is good, and the injection filling of the plasticizing material can be easily controlled, and thus the once-molding for shoes mostly uses plastic materials currently. However, the performance of plastic shoes, such as oil resistance, slipping resistance, high temperature resistance and cold resistance, is far less than the performance of rubber shoes. The physical properties of rubber shoes differ from the plastic shoes especially in fluidity, which results in a rigorous production process for rubber shoes.

According to the present disclosure, with the physical properties of rubber shoes differing from those of plasticizing material, the semi-molded shell and the inner lining are combined and vulcanized to form shoes with the inner lining. On one hand, it overcomes the molding difficulties of rubber shoes; on the other hand, it realizes a once-molding combination of the shell of rubber shoes with the inner lining by virtue of the properties, which omits the operation of placing the inner lining in the shoe body with rubber-shells and further pasting or sewing. It can realize that the rubber shoes with inner lining can be made by molding, which effectively improves the production efficiency of shoes with inner lining and reduces the production cost. Because the molding process does not rely on manual pasting and sewing processes, it can ensure the quality of the finished shoe with inner lining, and further improve the user experience.

In summary, the above embodiments are only for illustrating the technical solutions of the present application, and are not intended to limit the present application. Although the present application is illustrated in detail with reference to the embodiments described above, it should be understood by those skilled in the art that modification can be made to the technical solutions recited in the embodiments described above, or equivalent substitution can be made onto a part of technical features of the technical solution. The modifications and equivalent replacements will not make the corresponding technical solutions deviate from the scope of the technical solutions of the embodiments of the present application.

The invention claimed is:

1. A molding process for shoes with an inner lining, wherein the molding process is configured to realize the combined molding of a shoe shell and the inner lining, and the molding process comprises:
   providing a combined external mold comprising a first external mold and a second external mold; a molding inner core which is able to be placed in the combined external mold and cooperate for a mold-closing or mold-opening action, wherein the molding inner core is configured to be sleeved by the inner lining; a preset inner core which is able to be placed in the combined external mold and cooperate for the mold-closing or mold-opening action, wherein a first partition is provided on the preset inner core and extends in a circumferential direction along a part corresponding to an ankle;

placing the preset inner core in the combined external mold and performing the mold-closing action, wherein a shell molding space is formed between the preset inner core and the combined external mold after the mold closing action, the shell molding space matches the shape of the shoe shell, the shell molding space is separated to form a separate space by the first partition after the mold closing action, and the separate space is configured to form a partial semi-molded shell;

injecting a plasticizing material into the shell molding space to form the semi-molded shell adhered to inner walls of the first external mold and the second external mold;

performing the mold-opening action to separate the semi-molded shell along a joint of the first external mold and the second external mold so as to form two parts that move with the first external mold and the second external mold, respectively;

placing the molding inner core sleeved with the inner lining in the combined external mold being preset with the semi-molded shell;

performing the mold-closing action to form a shoe body molding space between the molding inner core and the combined external mold, and make the semi-molded shell in the first external mold and the second external mold attach to the inner lining, respectively, wherein the shoe body molding space matches the combination shape of the shoe shell and the inner lining, and the inner lining has a part exposed to the partial semi-molded shell; and heating to vulcanize the semi-molded shell, and combining with the inner lining to produce a shoe with inner lining.

2. The molding process for shoes with inner lining according to claim 1, wherein a shape and a size of the preset inner core are the same as a shape and a size of the combination of the molding inner core and the inner lining;

wherein the first external mold and the second external mold are thermal forming molds, and the molding inner core is a cold forming mold.

3. The molding process for shoes with inner lining according to claim 1, wherein the semi-molded shell is in an unshaped semi-molded state, and the semi-molded state is between a molten state and a cured molded state;

wherein the plasticizing material is rubber, and the inner lining is a foamed layer made of styrene-butadiene rubber (SBR) material.

4. The molding process for shoes with inner lining according to claim 1, further comprising:

performing a smooth finish treatment on an outer surface of the preset inner core so as to smooth the outer surface of the preset inner core.

5. The molding process for shoes with inner lining according to claim 4, wherein the first external mold and the second external mold are provided with a molding groove at opposite sides for molding the semi-molded shell;

wherein the molding process for shoes with inner lining further comprises:

performing a surface roughening treatment on inner walls of the molding groove to roughen the inner walls of the molding groove.

6. The molding process for shoes with inner lining according to claim 5, wherein the smooth finish treatment is electroplating polytetrafluoroethylene, and the surface roughening treatment is sandblasting.

7. The molding process for shoes with inner lining according to claim 1, wherein a second partition is provided on the preset inner core, and the second partition is located at the joint of the first external mold and the second external mold after mold closing;

wherein the separation of the semi-molded shell along the joint of the first external mold and the second external mold comprises:

the semi-molded shell is separated along the second partition.

8. The molding process for shoes with inner lining according to claim 1, wherein the molding process further provides a top mold and a bottom mold, wherein a sliding groove is provided on the top mold or the bottom mold, and the sliding groove is provided between the first external mold and the second external mold, and an extension direction of the sliding groove is perpendicular to the movement direction of the first external mold and the second external mold when the combined external mold is being closed;

the preset inner core or the molding inner core slides along the sliding groove to a position between the first external mold and the second external mold when being placed in the combined external mold.

* * * * *